United States Patent [19]

Betts et al.

[11] Patent Number: 4,690,417
[45] Date of Patent: Sep. 1, 1987

[54] FOLDABLE TROLLEY

[75] Inventors: David R. Betts, Dartford; Michael G. Edmonds, Bexley, both of United Kingdom

[73] Assignee: Kentinental Engineering Limited, Kent, England

[21] Appl. No.: 823,223

[22] Filed: Jan. 28, 1986

[51] Int. Cl.⁴ .............................................. B62B 3/00
[52] U.S. Cl. ..................................... 280/42; 108/116; 108/146; 188/31; 280/47.34
[58] Field of Search ...................... 280/35, 42, 79.1 R, 280/79.1 A, 47.34; 188/31; 108/111, 115, 118, 153, 146, 116; 297/44, 45; 182/146

[56] References Cited

U.S. PATENT DOCUMENTS

| | | | |
|---|---|---|---|
| 3,410,232 | 11/1968 | Krueger | 108/146 |
| 4,280,595 | 7/1981 | Timms et al. | 188/31 |
| 4,479,566 | 10/1984 | Ishii | 74/483 PB X |
| 4,534,446 | 8/1985 | Barcons | 182/146 |

FOREIGN PATENT DOCUMENTS 2117328 10/1983 United Kingdom ................ 280/42
2123761A 1/1986 United Kingdom .

Primary Examiner—John J. Love
Assistant Examiner—Michael Mar
Attorney, Agent, or Firm—Panitch, Schwarze, Jacobs and Nadel

[57] ABSTRACT

The invention concerns a trolley comprising a trolley top supportable on a foldable trolley base, for transporting heavy objects particularly between a first support surface and a vehicle and then from the vehicle to a further support surface. The base is foldable between an erected condition in which the sides are spaced apart and upright portions project upwardly from support portions and a folded condition in which the sides are juxtaposed and the upright and support portions lie adjacent one another.

In the erected condition a locking pin, at each side, carried by the support portion projects into an aperture in the base of an upright portion to lock the two portions together. When the sides are moved to their juxtaposed positions a release pin attached to the locking pin causes withdrawal of the locking pin from the aperture to allow the upright and support portions to be relatively pivoted to the folded condition.

The upright portion at each side is formed from upper and lower members telescopically slidable relative to one another and the trolley includes spaced engagement members at each side for locking the upper and lower members in selected relative positions to fix the height of the trolley. The engagement members at each side are operable by a common operating handle pivotally mounted to the lower member.

A lever operated brake is mounted adjacent one wheel so that repeated movement of the lever in a single direction alternately releases and engages the brake.

10 Claims, 6 Drawing Figures

FOLDABLE TROLLEY

BACKGROUND OF THE INVENTION

This invention relates to a trolley and trolley base and more particularly to a trolley with a base which can be collapsed or folded for transportation. The base is intended for use with a removable load carrying pallet or trolley top. The invention is particularly but not exclusively concerned with a base for the type of trolley intended for moving a heavy object from one support surface into a vehicle for transport to a further situation where it can be removed via the trolley onto another support surface. With such a trolley, the object to be moved is wheeled on the trolley to adacent the back of the car, the load supporting trolley top is moved off the trolley base on to the floor of a car and the base collapsed and also placed in the car; at the other end the base is again erected and the trolley top with the object on it slid or rolled back on to the base for further transportation.

A trolley base is known from UK Patent Specification No. 2123761 which has wheel means on which it can be pushed over the ground in an erected working condition and which is movable by a double folding action between that erected working condition and a folded condition. In the working condition the sides are spaced apart an upright portion and a support portion of each side extend at an angle to one another while in the folded condition the sides are juxtaposed to one another and the angle between the upright and support portions is reduced so that they lie substantially adjacent one another.

This invention is concerned with such a trolley base which has a number of novel features which may be taken separately or together. The trolley base disclosed in Specification No. 2123761 requires separate locking mechanisms on each side to be manually released before it can be folded to bring the upright and support members adjacent. It requires the retaining mechanisms on each side to be released before its height can be adjusted.

SUMMARY OF THE INVENTION

An object of the present invention at least in its preferred form is to provide a trolley base which folds and adjusts more easily.

One preferred feature comprises locking means arranged to lock the upright and support portions in their relative erected condition, which locking means is releasable by movement of the sides to their juxtaposed position. This allows quick and easy folding of the base.

In a preferred form the locking means comprises a locking pin (or the like) carried by one of the upright and support portions and biased to engage with the other of such portions to lock them together, which locking pin is connected to a release pin (or the like) which extends from one side towards the other and is arranged to be engaged by the other side as it is moved to the juxtaposed position to release the engagement of the locking pin and allow relative pivotal movement of the upright and support portions.

In one form the locking pin has a cam face engageable with said other portion when the portions are pivoted adjacent their erected condition said engagement acting to withdraw the locking pin against the bias to allow the portions to be fully engaged in their erected condition.

Preferably the support portion at each side of the base carries front and rear wheel members and the associated upright portion is hinged thereto to extend substantially vertically in the erected condition. The upright portions are preferably connected by a pair of cross members pivotally mounted together at their central portions and slidably attached to the upright members to allow them to be juxtaposed or ridigly spaced apart.

Each upright member preferably comprises a substantially rectangular frame covered by a panel. A portion of the frame at each side adjacent a cut out portion of the panel provides a carrying handle for carrying the base in its folded condition.

Another feature of the trolley base is formed by a brake for one or more of the wheels which is operated by a lever so that movement of the lever in one direction, conveniently depression of the lever by a foot, first puts the brake on and then a repeat movement in the same direction releases it. Another feature of the trolley base provides improved height adjustment means. Preferably each upright side portion is formed from upper and lower members telescopically slidable relative to one another, with locating means for locking the members in a selected one of a plurality of relative positions. The locating means comprises a pair of spaced engagement members carried by one of the members and respectively engagable with the other of the members and a common release handle for releasing both engagement members simultaneously. In a preferred form the release handle is pivotally carried by one of the members and has a portion in engagement with a pair of engagement pins engaging in respective ones of two series of vertically spaced apertures in the other member. Such an arrangement provides easier release and re-engagement of the locating means.

As a further feature the base and the trolley top which is lockable to the upper members of the upright sides include a further platform which can alternatively be connected to the trolley base support portions to provide a lower supporting platform under the load carrying trolley platform or is adapted to be releasably connected to the front of the trolley platform to provide an extension thereof.

BRIEF DESCRIPTION OF THE DRAWINGS

One embodiment of trolley base and trolley top, in accordance with the invention, will not be described, by way of example only, with reference to the accompanying drawings of which:

FIG. 7 is a view, on an enlarged scale, of the locating means of the height adjustment mechanism of the trolley base.

DETAILED DESCRIPTION OF ONE EMBODIMENT

Figure 1:
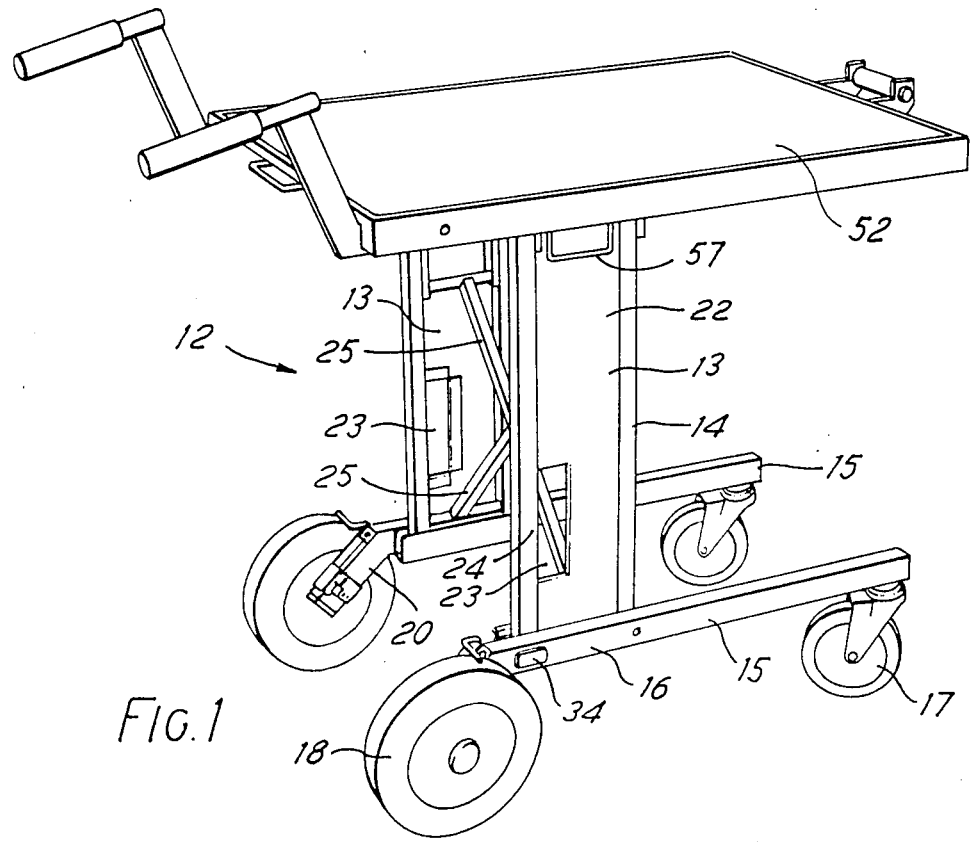
FIG. 1 is a perspective view of a trolley in its erected working condition.
Figure 2:
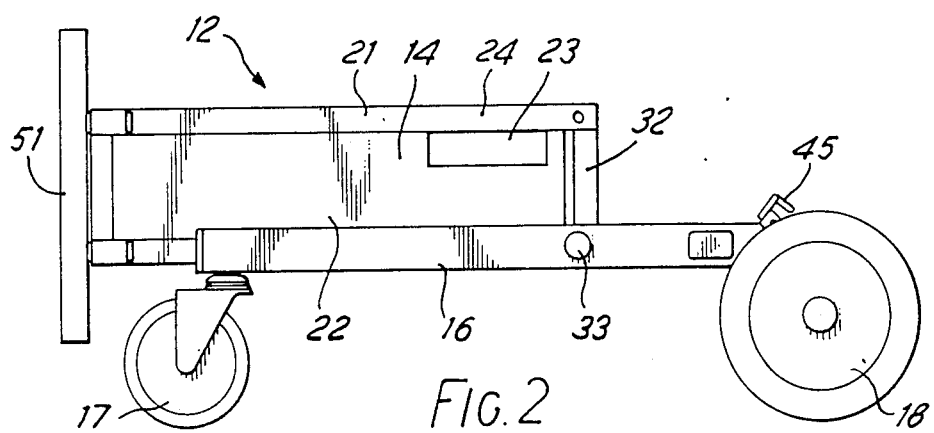
FIG. 2 is a side view of the trolley base in its folded condition.
Figure 3:
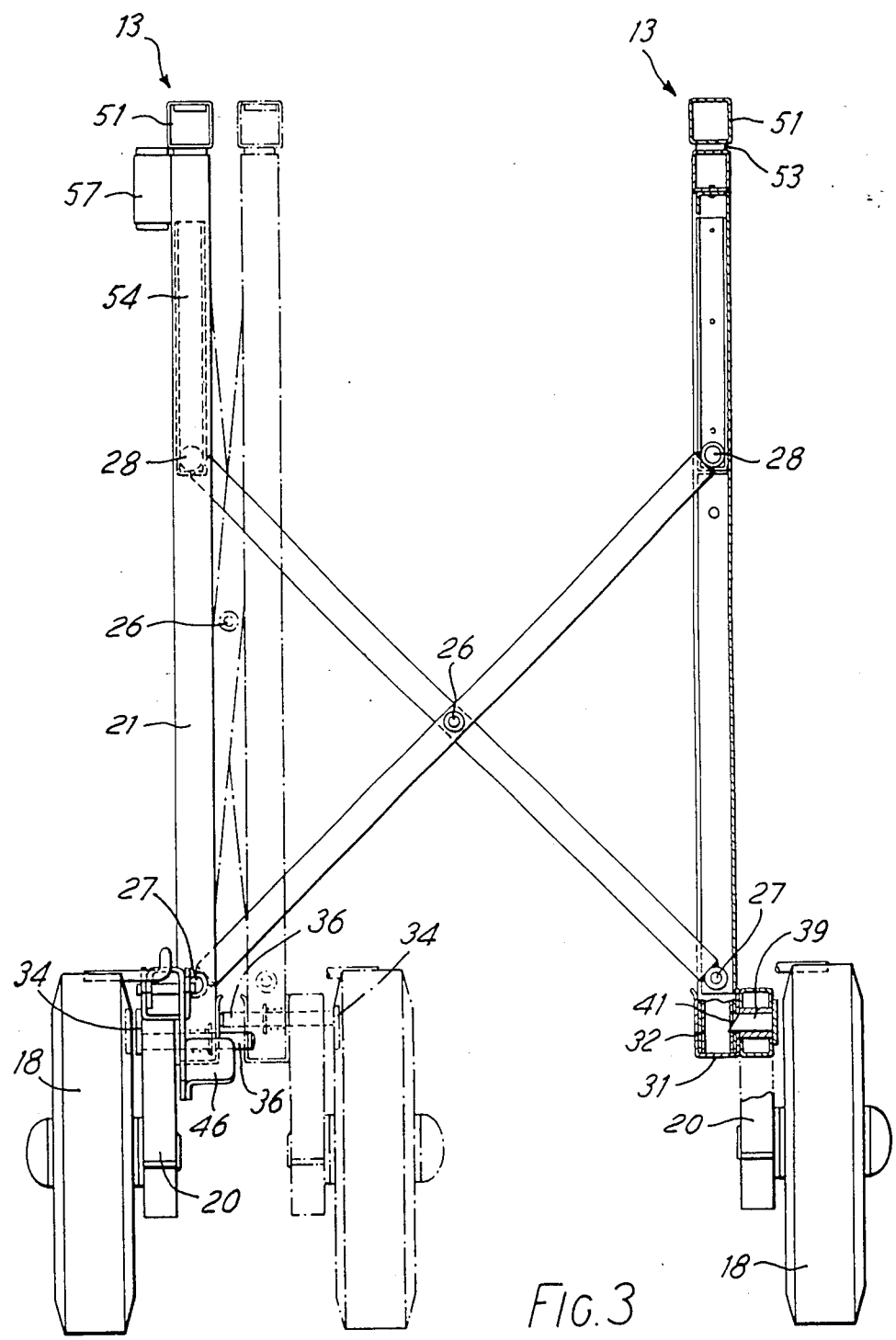
FIG. 3 is a rear view of the trolley base in its erected condition with a portion of one side in section.
Figure 4:
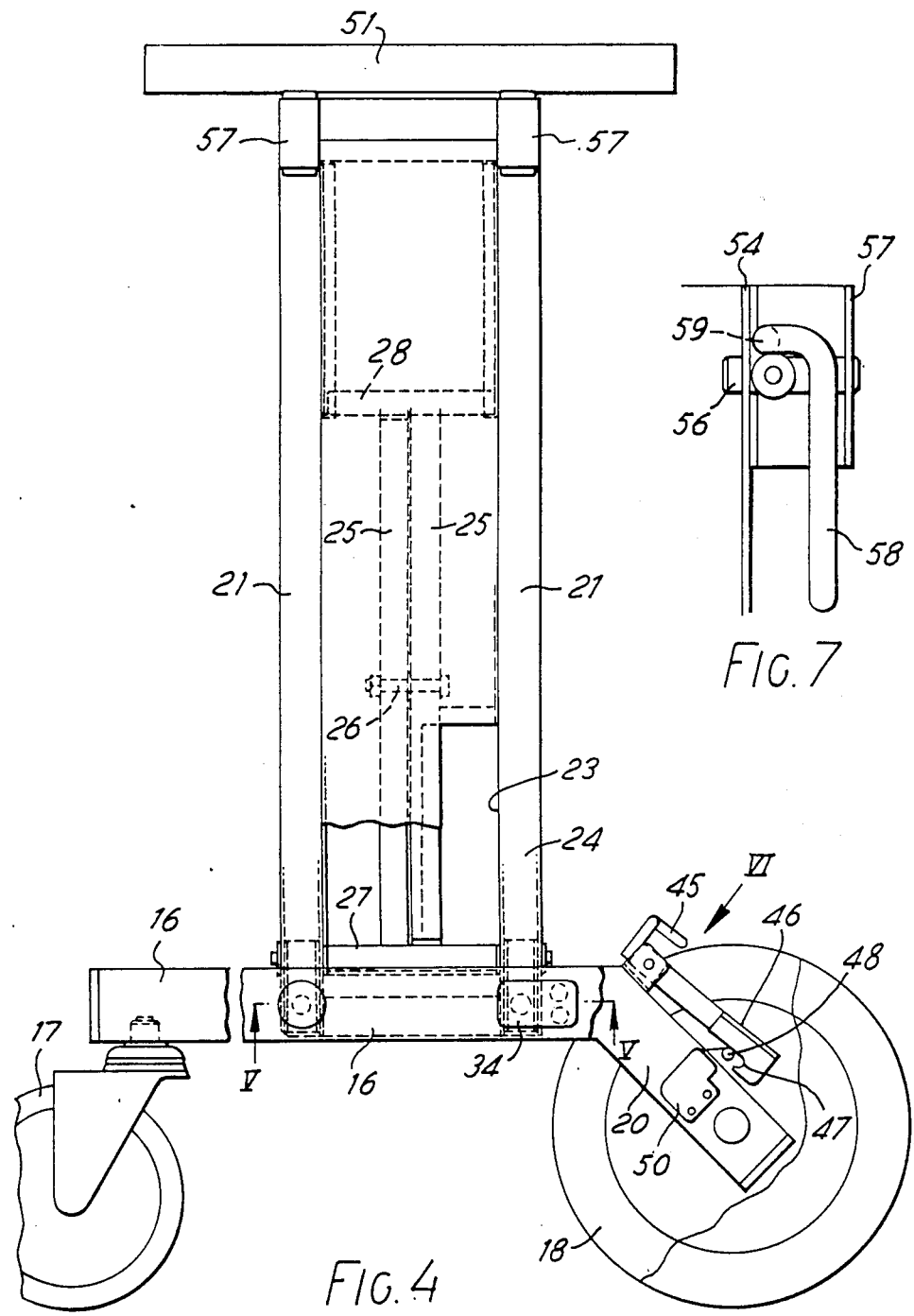
FIG. 4 is a side view from the inside of one side of the trolley base.
Figure 5:
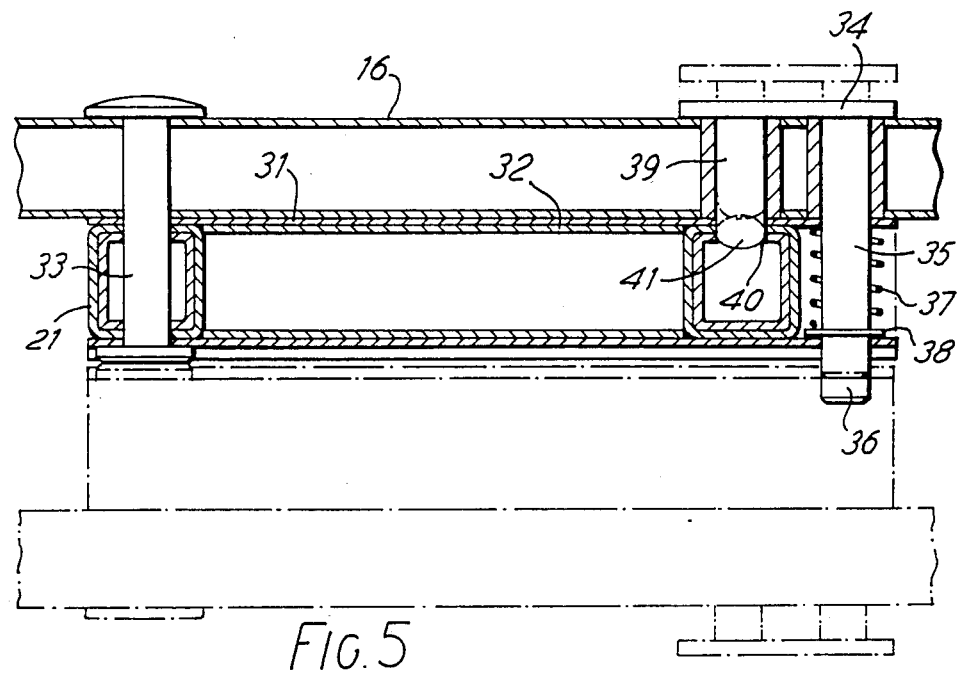
FIG. 5 is a section on the line V—V of FIG. 4.
Figure 6:
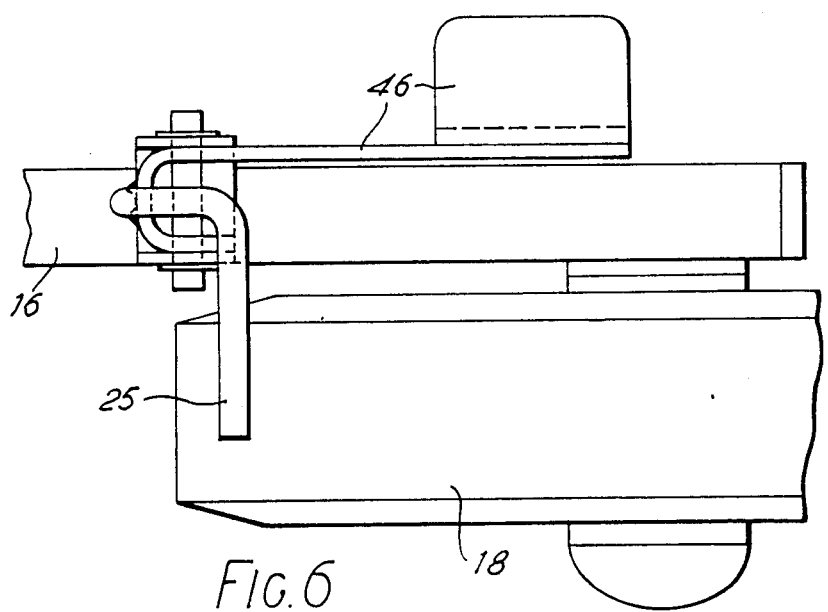
FIG. 6 is a plan view of the braking arrangement seen in the direction of arrow V1.

A trolley base 12 comprises a pair of sides 13 each having an upright portion 14 and a base support portion 15. Each base support portion 15 comprises an elongate member 16 in the form of a rectangular sectioned horizontal tube carrying a front wheel member in the form of a castor 17 and a rear wheel member 18 journalled to a downwardly angled portion 20 of the elongate member 16.

Each upright portion 14 is a generally rectangular frame made from square sectioned tubular or channelled elongate members 21 closed by a panel 22. A part 23 of each panel 22 is cut away adjacent a part 24 of the frame to provide carrying handles for the folded base.

The two upright side portions 14 are connected by cross members 25 pivotally connected at 26 adjacent their central portions and having end portions 27, 28 located in channels in the upright frames. The lower end portions 27 are pivotally mounted adjacent the lower parts of the upright portions and the upper end portions 28 are guided for sliding movment in channels in the frames to allow the sides to move to a position juxtaposed to one another in the folded condition or to be held rigidly spaced apart in the erected condition.

At each side an upwardly opening channel sectioned hinge bracket 31 is secured to the inner side of elongate member 16. The lower frame member 32 of each upright portion is pivotally secured to member 16 by a hinge pin 33 extending through one member 21 and through the hinge bracket so that the upright portions can be pivoted between an upright erected condition in which the frame members 32 are located in hinge brackets 31 and a folded condition in which they lie adjacent the elongate members 16.

At each side a locking pin plate 34 is slidably mounted to elongate member 16 so that a guide/release pin 35 carried thereby extends through the member 16 and hinge bracket 31 and has its end 36 rojecting beyond the hinge bracket towards the other side. A spring 37 bearing against flange 38 of the pin 35 biases the pin towards the other side. A locking pin 39 also carried by the plate 34 extends through member 16 and into the channel defined by the hinge bracket. In the erect condition of the base this locking pin extends into a aperture 40 in one frame member 31 of the upright portion, and locks the upright portion in the erected condition. When the two sides are moved to their positions juxtaposed to one another each side acts on the release pin 35 of the other side to push it against the bias of the spring 37 into a position in which the locking pins 39 are disengaged from the upright portions so that the upright portions can be pivoted to the folded condition. The end face 41 of each locking pin 39 is chamfered at an angle of 30 degrees to the vertical so that as the base is re-erected the pin is moved outwardly by engagement with the frame member 21 of the upright portion entering the channel of the hinge bracket until the aperture 40 in the frame member is opposite the locking pin which will then engage therewith.

A brake arm 45 connected to a brake lever 46 is pivotally mounted to one elongate member 16 for movement between a braking position, engaging one wheel 18, and a brake released position clear of the wheel. The lever is positioned to be easily depressed by the foot of a user and has a hooked portion 47 engagable with a catch 48 of a catch mechanism 50 (of known form) which releases or engages with the hooked portion on alternate depressions. Such an arrangement provides easier operation and release of the brake than the conventional lever which needs to be moved in opposite directions to engage or release the brake.

Each upright portion is formed from upper and lower parts. The upper part comprises a cross bar 51 intended to support and have locked thereto a trolley platform 52 and two depending legs 53 which are telescopically slidable in the hollow tubular side frame members 54 of the lower upright portion. The side faces 55 of the legs 53 are formed with a series of vertically spaced holes to receive locating pins 56 mounted in extensions 57 on the frame members 54. The locating pins are engaged by a common operating handle 58 having its ends 59 bent out of the plane of the handle and pivotally mounted in the extensions 57 so that pivotal movement of the handle engages or releases both pins together allowing easier adjustment of the height of the support cross bars 51 and thus the height of the trolley base.

What is claimed is:

1. A trolley comprising a trolley base and a trolley top arranged to be releasably supported on the trolley base, the trolley base having two sides each of which has an upright portion and a support portion and wheel means on which the trolley base can be pushed over the ground in an erected working condition in which the upright and support portions are at an angle to one another and the sides are spaced apart and which trolley base is movable by a double folding action between the erected condition and a folded condition in which the sides are juxtaposed and the angle between the upright and support portions is reduced so that they lie substantially adjacent one another, and including locking means arranged to lock the upright and support portions in their relative erected condition and release means coupled to the locking means and arranged to release the locking means on movement of the sides to the juxtaposed condition and means arranged to cause the locking means to automatically re-engage when the upright and support portions are moved to their relative erected condition with the sides spaced from one another.

2. A trolley comprising a trolley base and a trolley top arranged to be releasably supported on the trolley base, the trolley base having two sides each of which has an upright portion and a support portion and wheel means on which the trolley base can be pushed over the ground in an erected working condition in which the upright and support portions are at an angle to one another and the sides are spaced apart and which trolley base is movable by a double folding action between the erected condition and a folded condition in which the sides are justaposed and the angle between the upright and support portions is reduced so that they lie substantially adjacent one another, and including locking means arranged to lock the upright and support portions in their relative erected condition and release means coupled to the locking means and arranged to release the locking means on movement of the sides to the juxtaposed condition, in which the locking means comprises a locking member carried by one of the upright and support portions and biased to engage with the other of such portions to lock them together, in which the locking member is connected to a release member which extends from one side towards the other side and is arranged to be engaged by the other side when the sides are moved to their juxtaposed positions to release the engagement of the locking member and allow relative pivotal movement of the upright and support portions.

3. A trolley according to claim 2 in which the locking member and release member are locking and release pins mounted on the support portion and the locking pin is arranged to engage with an aperture defined by the upright portion.

4. A trolley according to claim 2 or 3 in which each support portion has a member defining an upwardly opening channel and each upright portion has a base arranged to be received in the channel in the erected condition and in which the locking member projects into the channel.

5. A trolley according to claim 2 or claim 3 in which the locking member has a cam face engagably with said other portion when the portions are pivotted adjacent their erected condition such that the engagement acts to withdraw the locking member against the bias to allow the portions to be engaged in their erected condition.

6. A trolley according to any of claims 1, 2 or 3 including a brake means mounted to act on one wheel means and a brake lever arranged to operate the brake means such that repeated movement of the lever in a single direction alternately releases and engages the brake.

7. A trolley according to claim 1, 2 or 3 in which each upright portion is formed by a frame closed by a panel and a portion of each panel is cut away so that parts of the frames adjacent the panels form carrying handles for the base in the folded condition.

8. A trolley according to any of claims 1, 2 or 3 in which each upright portion is formed from upper and lower members telescopically slidable relative to one another and including locating means for locking the upper and lower members in a selected one of a plurality of relative positions to determine the height of the trolley base, in which the locating means comprises a pair of spaced engagement members carried by one of the upper and lower members and engageable with the other of the upper and lower members and a common operating handle arranged to release or engage both engagement members simultaneously.

9. A trolley according to claim 8 in which the handle has parts bent out of the plane of the handle acting on each of the engagement members and including means pivotally mounting the handle to the lower member.

10. A trolley according to any of claims 1, 2 or 3 in which each upright portion is formed from upper and lower members telescopically slidable relative to one another and including locating means for locking the upper and lower members in a selected one of a plurality of relative positions to determine the height of the trolley base, in which the locating means comprises a pair of spaced engagement members carried by one of the upper and lower members and engageable with the other of the upper and lower members and a common operating handle arranged to release or engage both engagement members simultaneously, and in which the handle has parts bent out of the plane of the handle acting on each of the engagement members and including means pivotally mounting the handle to the lower member.

* * * * *